United States Patent [19]

Ishida et al.

[11] Patent Number: 4,491,522
[45] Date of Patent: Jan. 1, 1985

[54] ANAEROBIC DIGESTION PROCESS FOR ORGANIC WASTES

[75] Inventors: Masahiko Ishida; Ryoichi Haga; Tadashi Ishibashi; Yoji Odawara, all of Hitachi, Japan

[73] Assignee: Agency of Industrial Science & Technology, Tokyo, Japan

[21] Appl. No.: 551,730

[22] Filed: Nov. 15, 1983

[30] Foreign Application Priority Data

Nov. 18, 1982 [JP] Japan .................... 57-201208

[51] Int. Cl.³ .......................... C02F 3/28; C02F 3/30
[52] U.S. Cl. ................................. 210/603; 210/605; 210/630; 48/197 A; 435/167; 435/801
[58] Field of Search ............... 210/603, 605, 612, 613, 210/630, 625, 218, 195.1; 48/197 A, 111; 435/167, 801

[56] References Cited

U.S. PATENT DOCUMENTS

| | | | |
|---|---|---|---|
| 4,213,857 | 7/1980 | Ishida et al. | 210/603 |
| 4,297,216 | 10/1981 | Ishida et al. | 210/603 |
| 4,375,412 | 3/1983 | Schimel | 210/603 |
| 4,442,006 | 4/1984 | Ishida et al. | 210/613 |

FOREIGN PATENT DOCUMENTS

2621524 11/1976 Fed. Rep. of Germany ...... 210/603

| | | | |
|---|---|---|---|
| 56-31159 | 7/1981 | Japan | 210/603 |
| 58-8590 | 1/1983 | Japan | 210/603 |
| 58-61899 | 4/1983 | Japan | 210/603 |
| 58-74190 | 5/1983 | Japan | 210/603 |

*Primary Examiner*—Benoit Castel
*Attorney, Agent, or Firm*—Birch, Stewart, Kolasch & Birch

[57] ABSTRACT

The present invention relates to an anaerobic digestion process for organic wastes with a high efficiency and an improved recovery rate of methane.

This process comprises the following steps: (1) anaerobically digesting organic wastes under simultaneous presence of facultative anaerobic bacteria and obligatory anaerobic bacteria, (2) separating the anaerobically digested slurry obtained from the step (1) into a liquor fraction containing the two groups of bacteria and an undecomposed solid fraction, (3) mixing the liquor fraction obtained from the step (2) with the surplus activated sludge slurry produced by anaerobically treating organic waste water, under anaerobic condition, (4) separating the mixed slurry obtained from the step (3) into a solid fraction containing the surplus activated sludge which has absorbed the two groups of bacteria and a liquor fraction, and recycling back the solid fraction obtained from the step (4) as the sources of the two groups of bacteria and nitrogen to the step (1).

4 Claims, 5 Drawing Figures

ANAEROBIC DIGESTION PROCESS FOR ORGANIC WASTES

BACKGROUND OF THE INVENTION

The present invention relates to a process of treating organic wastes for recovering methane from organic wastes by fermentation effect of anaerobic bacteria.

In the past, an anaerobic digestion process (methane fermentation process) has been employed for treating such organic wastes as sewage sludge, human and livestock wastes and food processing drainage. This process not only suits for treating wastes which contain much water and which present some difficulties in incineration, but also has a feature facilitating recovery of methane, a source of clean energy. In western countries, gas power generation has been practiced since long, and in Japan as well it has become popular in recent years. As this anaerobic digestion process, however, depends on the principle of anaerobic fermentation by anaerobic bacteria having a lesser speed of fermentation than that of aerobic bacteria which are used for aerobic treatment, it takes more than a week even in a quickest treatment, or usually requires such a long period of time for treatment (time of residence in fermentation tank) as 15 to 50 days. On account of growing restriction in recent years on the sites of new treatment installations, it now requires a speedier treatment and a more compact facility.

It is known that in anaerobic digestion the organic matters are only decomposed into methane when they come through two different fermentations; i.e. first, a liquefying fermentation wherein the organic matters are turned into such volatile fatty acids of low molecular weight as acetic acid, propionic acid and butyric acid by the effect of facultative anaerobic bacteria (liquefying bacteria or septic bacteria), and second, a gasifying fermentation wherein thus generated fatty acids are converted into methane through the effect of obligatory anaerobic bacteria (gasifying bacteria or methane bacteria). The digestion process presently being practiced is a mixed fermentation method which carries out two fermentations, namely, liquefaction and gasification within the fermentation tank under the co-presence of these two groups of bacteria. Recently, a study is being made for a separate fermentation method which performs these two fermentation independently from each other, as a method for making the fermentation time further shorter than that of the mixed fermentation method.

In general, as one of the means to improve fermentation speed in a continuous waste treatment, there is one means wherein the concentration of bacteria in the fermentation tank is increased by recycling the bacteria back to the fermentation tank after recovering them. This means is very commonly used in the activated sludge process. In the activated sludge process, first, the waste water having all solid matters removed by a sedimentation process is treated. In the process of aerobic treatment, the aerobic bacteria which proliferate in the aeration tank flocculate into flocs that precipitate by gravitation and can very easily be separated from the waste water under treatment. In this case, most of the excess sludge is of aerobic bacteria, so that to recycle it after recovery to the aeration tank is very useful from the standpoint of improving the treatment efficiency.

As for the anaerobic digestion process as well, there is a case, wherein the solid fraction produced from fermentation slurry through solid-liquor separation by a sedimentation process, i.e. digested sludge, is recycled back to the fermentation tank. In the anaerobic digestion, however, since its purpose is to decompose solids unlike the activated sludge process, feedstock is charged into the fermentation tank without removing any solid matters contained therein. Further, in case of anaerobic digestion, most of the solids within the digestion slurry are non-digestible solids as the yield of bacteria is less than 1/10 of aerobic bacteria. Recycling of digested sludge, therefore, invites an increased concentration of solids in the fermentation tank and has a drawback in increasing the dimension of the tank and giving added burden on the stirrer. The unfavorable effect of this drawback is extremely explicit in case of the feedstock involving much non-digestable solids such as city garbage which is expected to become a practicable feedstock for this process, let alone those sewage sludge and human and livestock wastes to which the process is presently applied.

Incidentally, recycling the digested sludge back to the fermentation tank is being praticed only because, in the first place, both of the anaerobic bacteria have been presumed to have been deposited on the undecomposed solids in the digested sludge and have been concentrated, and, secondly, even if the bacteria in the waste water under treatment are supposed to exist in a suspended situation, no practicable means for concentration-separation without biologically deactivating the bacteria has not so far been identified. It has not been clarified yet whether a greater proportion of those two bacteria is dispersed in the solid fraction of slurry (digested sludge) or whether in the liquor fraction (treated water), due to a lack of any reliable analysis method.

Thereupon, the present inventors had checked by microscope in what manner the bacteria exist in various kinds of anaerobic digested slurry, and, as a result, they found that those anaerobic bacteria suspended in the liquor are far greater in their proportion than those which are deposited on such solids which are not easily decomposable as cellulosic fibers.

Based on the aforementioned new knowledge, and as a result of their serious efforts for identifying a process highly practicable for recovering cells of both anaerobic bacterial cells contained in the anaerobically digested liquor, they acquired another new knowledge as cited here below. When excess activated sludge which is produced by treating organic waste water with activated sludge was added to the digestion treatment water and stirred/mixed under an open atmosphere, it was discovered that (1) both anaerobic bacteria were effectively deposited on excess activated sludge, and (2) they could easily be precipitated/separated together with excess activated sludge through gravity sedimentation. Upon testing the fermentation activity of both anaerobic bacteria thus recovered, it was made known that the beginning of fermentation delayed three to six days and the fermentation activity as well was low. In other words, it was noted that even if physically the bacterial cells could be recovered, their biological activity was damaged. Then through further research efforts, it was finally clarified that if the stirring be performed under an anaerobic conditions, there would be no delay in the beginning of fermentation and the fermentation activity could be high enough.

The present invention has been the product based on a number of new discoveries as mentioned above.

SUMMARY OF THE INVENTION

The objective of the present invention is to eliminate the aforementioned drawbacks of the conventional art and present an anaerobic digestion process of organic wastes.

The first characteristic feature of the present invention is the formation of excess activated sludge flocs which hold anaerobic bacteria therein without letting them lose their fermentation activity, by bringing anaerobic bacteria in contact with excess activated sludge under anaerobic conditions, after adding excess activated sludge to the processing waste water that is the anaerobically digested slurry from which undigested solids are removed.

The second characteristic point of the present invention is to recycle back to the anaerobic fermentation tank the anaerobic bacteria and excess activated sludge composite after separating them from each other.

DESCRIPTION OF THE PREFERRED EMBODIMENT

Next, the present invention is described further in detail according to the order of processes.

So long as the feedstock wastes consist of organic materials decomposable by microorganisms as their main ingredient, the present invention is fully applicable. For example, sewage sludge, food processing waste water, human and livestock wastes and city garbage can be the feedstock. In case where these wastes contain solid materials of large particle size, the feedstock may be subjected to grinding as the case may be. Also in a case like city garbage that may contain such ingredients which do not contribute to fermentation as metals, small gravels, pieces of plastics and fragments of glass, it is useful to subject it to a pretreatment that may facilitate anaerobic digestion, i.e. to remove and separate these foreign materials, or to treat them by heat.

Figure 1:
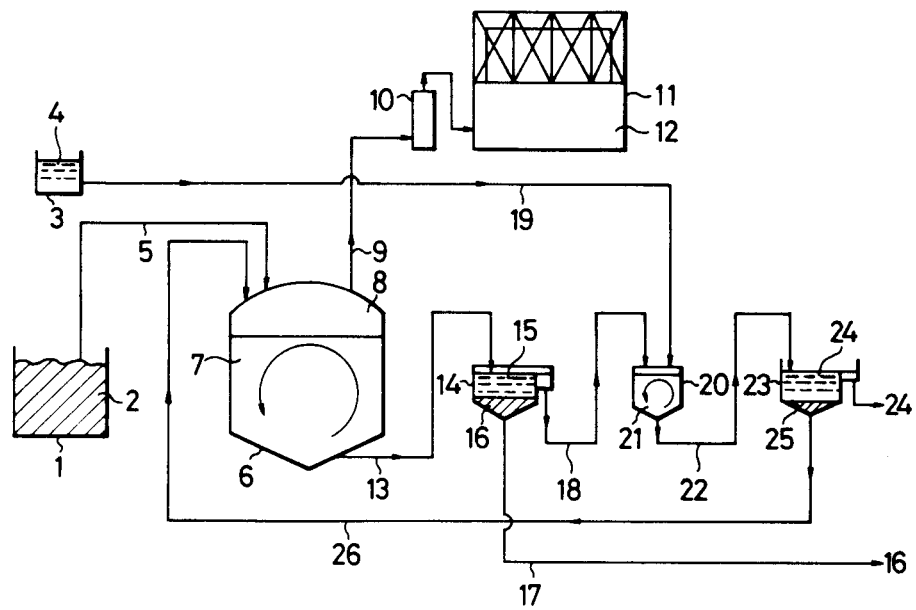
FIGS. 1, 2, 3 and 4 show the overall flowsheet of the present invention.

As mentioned above, the methods for anaerobic digestion can be broadly divided into two methods; namely, the mixed fermentation method and two phase fermentation method. The present invention can be applied to these methods. First, description is made hereunder on the mixed fermentation method which is shown in FIG. 1. Feedstock wastes 2 are charged into the liquefied gasification mixed fermentation tank 6 from the feedstock tank 1 through the transport piping 5, and an anaerobic digestion is performed. As the fermentation bacteria, a mixture of liquefying fermentation bacteria and gasifying fermentation bacteria is employed. As the liquefying fermentation bacteria which decompose organics into volatile fatty acids, for example, those which belong to Cristoridium genus, Bacillus genus and Esherichia genus may be used. As the gasifying fermentation bacteria which transform volatile fatty acids into methane, for example, those which belong to Methanococcus genus, Methanosarcina genus and Methanobacterium genus may be used. The conditions for fermentation including fermentation temperature can sufficiently be met by those which are publicly known so far. To be concrete, if they are temperature $15° \sim 70°$ C., oxidation-reduction potential not more than $-200$ mV, pH $6.5 \sim 8.0$ and organics load not less than 30 Kg - organics/effective dimension of fermentor $m^3.d$, they are sufficient for facilitating fermentation reaction. The fermented gas 8 which generates from fermentation is transmitted by the transport piping 9 through the desulfurizer 10 to the gas storage tank 11 to be stored there. The composition of the gas depends on the feedstock and the species of bacterium employed, but generally it contains methane $40 \sim 80\%$, carbon dioxide $20 \sim 60\%$ and, in addition, trace amount of hydrogen, nitrogen and hydrogen sulfide. This fermented gas can also sufficiently be used as fuel for the heating boiler for heating the fermentation tank and the gas electric generator for the stirrer.

Next the fermentation slurry 7 is led into the solids-liquor separation tank through the transport piping 13 and is separated into undigested solid fraction and liquor fraction 15 in which facultative anaerobic bacteria cells and obligatory anaerobic bacterial cells are to be suspended. As for the method of separating solids and liquor, it is imperative to limit the contact with oxygen down to the minimum, so that the gravitational precipitation method is most suited. Generally, for these undigested solids which have a larger particle size and rather easily precipitate, just 10 minutes or so is sufficient for their residence time. Thus separated undigested solid fraction 16 is extracted out from the system by the piping 17, and, depending on necessity, it is further turned into dehydrated cake by pressurized dehydration or centrifugal separation and finally disposed as cakes. The liquor fraction 18 is mixed with the excess activated sludge 4 at the mixing tank 20. A suitable excess activated sludge for this operation is a fresh one, or that was kept in storage not more than six hours, or that was stored with ventilation. As for its dose, its SS (Suspended Solid) concentration is required to be not less than 0.2%. Should this concentration surpass 1%, however, the solid-liquor separation that will be dealt with later becomes difficult, so that its practical range is $0.2 \sim 1.0\%$. The temperature at the contact time is not specifically designated. The atmosphere under the operation should be anaerobic. Stirring under an open atmosphere impedes the fermentive activity of the anaerobic bacteria, particularly that of the obligatory anaerobic bacteria. It is, therefore, necessary to carry out this process under an oxydation-reduction potential not more than $-50$ mV. The slurry 21 kept in the mixing tank 20 is led into the solid-liquor separation tank 23 by way of the transport piping 22, and is separated into liquor fraction 24 and a solid fraction 25 containing excess activated sludge in which anaerobic bacteria is held. This separation must be performed under an anaerobic condition not more than $-50$ mV. As to the separation method, therefore, the gravitational precipitation method is most effective and practical. The time required for separation varies with the given excess activated sludge and the characteristic feature of the fermentation treatment waste water, but in most cases a precipitation time of not less than 30 minutes is required. The liquor fraction 24 is discharged outside the system, whereas the solid fraction 25 is recycled back in total to the fermentation tank 6 by way of the transport piping 26, as the bacterium bodies of facultative anaerobic bacteria and obligatory anaerobic bacteria for recycling. By this recycling of the solid fraction back to the fermentation tank, the effective bacterium concentration can be raised without returning unrequired undigested solids back to the fermentation tank and can improve the fermentation speed or the treatment efficiency.

Figure 2:
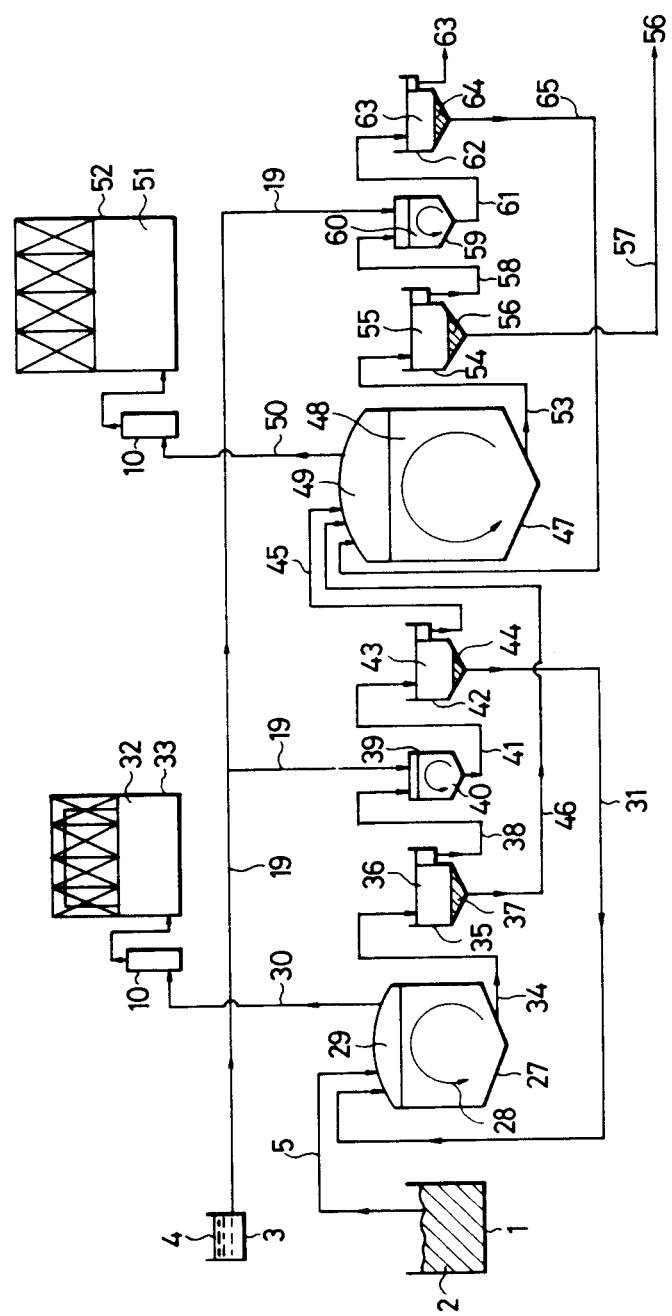

In this present invention, if the separation fermentation method is employed, it would take the flowsheet as shown in FIG. 2. In other words, the feedstock wastes 2 are charged into the liquefying fermentation tank 27 by way of the transport piping 5, and there a liquefied fermentation is performed with facultative anaerobic bacteria. As for the fermentation bacteria, the facultative anaerobic bacteria which are employed in a mixed fermentation can be applied. Of the conditions for fermentation, only its pH should tilt toward the acidic side at 4.0~6.8, while the rest remain unchanged from those for the mixed fermentation. The gas 29 which generates during fermentation is transmitted by the transport piping 30 on to the desulfurizer 10 and then on to the storage tank 33 where the gas is stored. The composition of this gas depends on the feedstock and the bacterium species, but it generally comprises hydrogen 40~60% and carbon dioxide 60~40%, and other than these some trace amounts of nitrogen and hydrogen sulfide are contained. The fermented slurry 28 is led by way of the transport piping 34 into the solid-liquor separation tank 35 and there separated into the undecomposed solid fraction 37 and the liquor fraction wherein facultative anaerobic bacteria are suspended. As to the solid-liquor separation method and the conditions thereof remain unchanged from those for the mixed fermentation, with the only exception of pH which should be 4.5~7.5. Next, the liquor fraction 36 is mixed with the excess activated sludge 4 at the mixing tank 39, and then separated into the solid fraction 44 and liquor fraction 43 in the solid-liquor separation tank 42. The conditions for mixing and separation are identical to those for the mixed fermentation. The solid fraction 44 which is the excess activated sludge wherein facultative anaerobic bacteria are suspended is recycled back to the liquefying fermentation tank 27 as the facultative anaerobic bacteria for recycling. The solid fraction 37 containing undecomposed solids and the liquor fraction 43 containing volatile fatty acids are charged into the gasifying fermentation tank 47, and get in contact with obligatory anaerobic bacteria. Herein, a main reaction, wherein volatile fatty acids convert into methane, takes place and simultaneously a side reaction, wherein the excess activated sludge to be recycled back as the carrier of obligatory anaerobic bacteria that will be dealt with later, is subjected to the liquefying fermentation and thereafter gasifying fermentation, also takes place. The supply source of the facultative anaerobic bacteria for the excess activated sludge is the solid fraction 37 containing undecomposed solids. As regards the obligatory anaerobic bacteria which are employed for gasifying fermentation, the bacteria which are employed for mixed fermentation can be used as is. The conditions for fermentation are identical to those for mixed fermentation. Fermented gas is transmitted by the piping 50 on to the desulfurizer 10 and then on to the storage tank 51 for storing. The gasifying fermentation slurry 48 is led into the precipitation tank 54 by way of piping 53 for solid-liquor separation, and here the slurry is separated into the solid fraction 56 containing undecomposed solids and the liquor fraction 55 wherein mainly obligatory anaerobic bacterium bodies are suspended. The liquor fraction 55 is mixed with the excess activated sludge within the mixing tank 59, and then separated into the solid fraction 64 and the liquor fraction 63 at the solid-liquor separation tank 62. The solid fraction 64 which is excess activated sludge holding obligatory anaerobic bacterial cells is recycled back to the gasifying fermentation tank. The conditions for the mixed fermentation method can be applied correspondingly to these mixing and separation.

Figure 3:
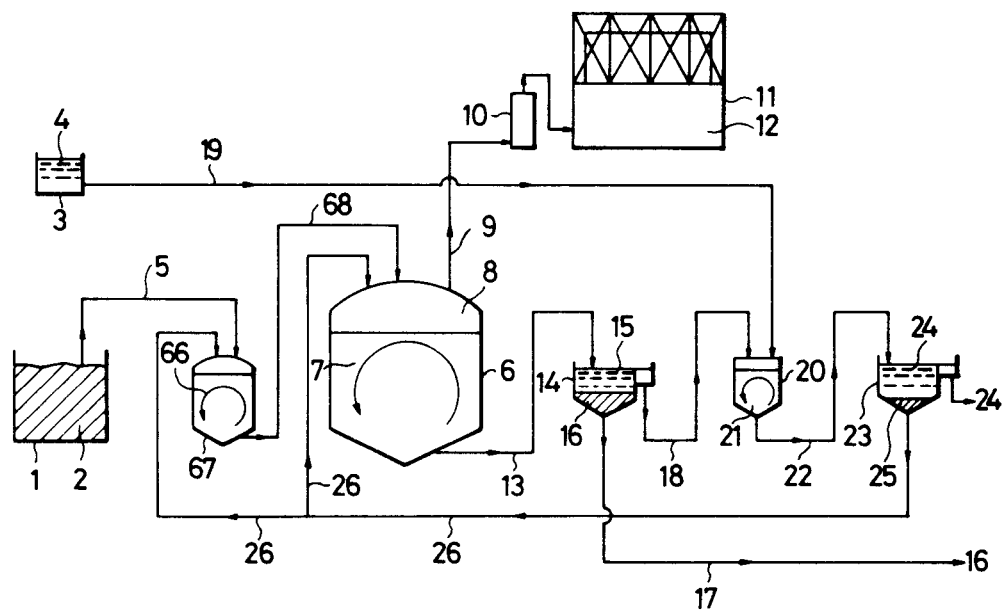
Figure 4:
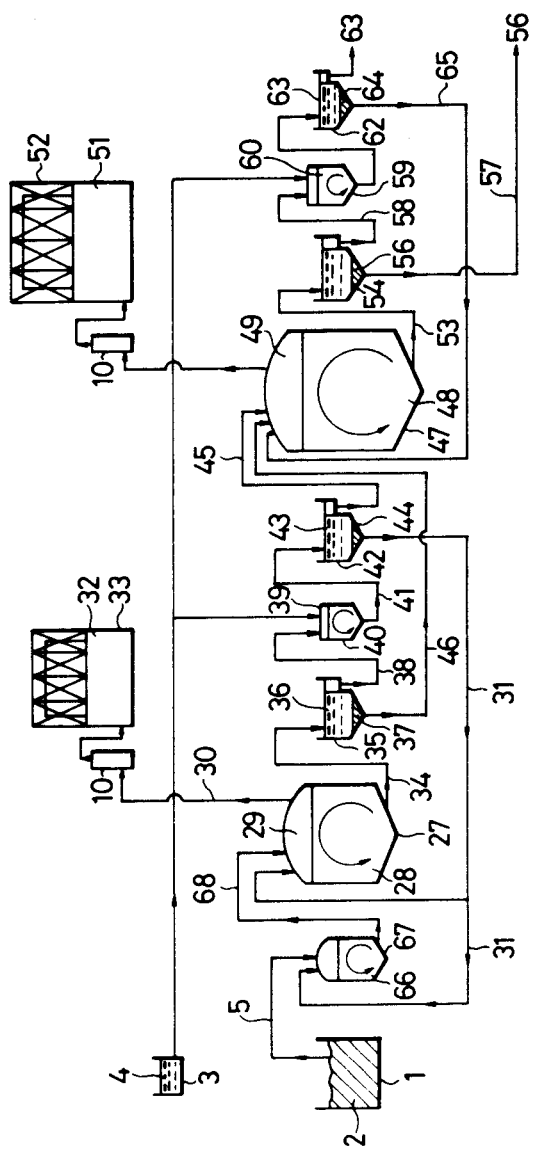
Figure 5:
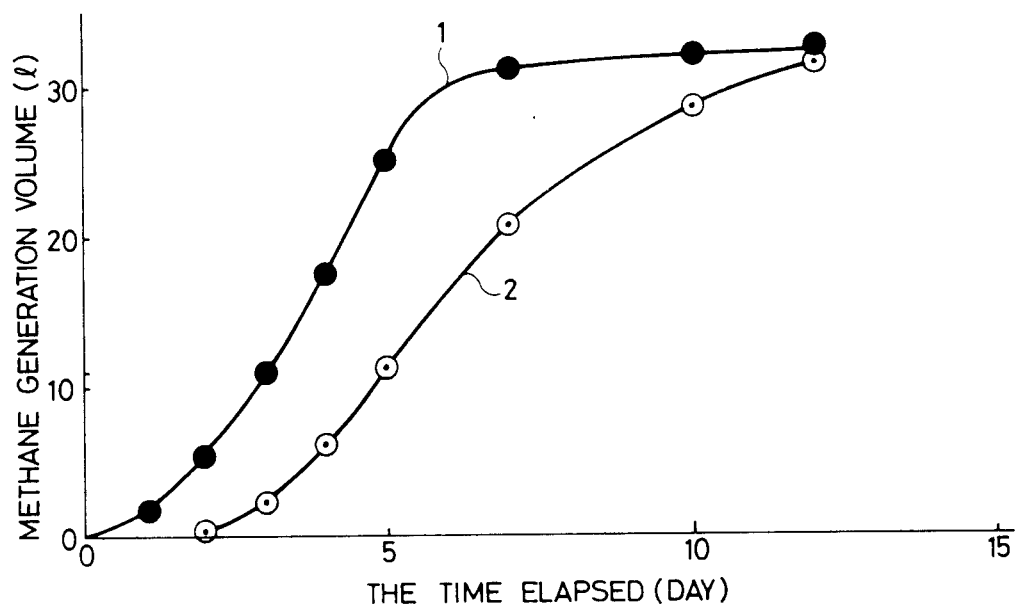
FIG. 5 is the graph exhibiting the effect of the preferred embodiment and the comparative example.

Incidentally, in case of taking city garbage, pulp sludge or various cellulose biomass as the feedstock, it is to stir the slurry containing fibers in the course of fermentation and it tends to consume much energy for stirring. In such a case, the following procedure is specifically effective. That is, prior to mixed fermentation or liquefying fermentation, which employs as facultative anaerobic bacteria, those bacteria which have a cellulose separating capability, the sludge containing facultative anaerobic bacteria of high concentration is recovered by the above-mentioned method. The sludge is mixed with the feedstock and to modify the cellulosic fibers are modified into shorter fibers through a reaction for a certain period of time, and then passed to the fermentation process. In other words, it puts a pretreatment tank 67 prior to the fermentation tank as shown in FIGS. 3 and 4 respectively. In case of the mixed fermentation of FIG. 3, the feedstock 1 is mixed with the recovered sludge (solid fraction 25) containing facultative anaerobic bacterial cells and obligatory anaerobic bacterial cells, while, in case of the separated fermentation of FIG. 4, the feedstock 1 is mixed with the recovered sludge (solid fraction 44) containing facultative anaerobic bacterial cells, and in both cases the mixture is to be held for 0.1~1 days anaerobically. As the cellulose decomposing enzyme secreted by the facultative anaerobic bacteria in this process converts the contained fibers into much shorter ones, the stirring operation at the fermentation tank is made much easier.

According to the present invention, by recovering with efficiency the anaerobic bacteria contained in the fermentation slurry without accompanying any undecomposed solids and without losing any bioactivity and recycling them back to the fermentation tank, the effective concentration of bacteria within the fermentation tank can be kept at 1.5~1.9 times of what was possible by the prior art. Accordingly, the number of days required for fermentation can be reduced to 70%~55% of those required so far.

Hereinafter, the present invention is explained in further details with its preferred embodiment and comparative example.

PREFERRED EMBODIMENT

One kilogram of the fermented slurry, which had been produced by anaerobically digesting the slurry (solid concentration 8%) of the city garbage of the composition shown in Table - 1 at 60° C. and pH 7.0, was taken up in a one liter mess-cylinder. By replacing its vapor-phase part with nitrogen gas, it was placed stationary for 10 minutes, and let the undecomposed solids precipitate. Next, it was separated into 0.21 Kg of solid fraction and 0.79 Kg of liquor fraction by decantation. To 100 g of this liquor fraction which was taken up in a 300 ml mess-cylinder, 192 g of the excess activated sludge (solid concentration 0.7%) of city sewerage was added within a nitrogen atmosphere. After stirring it slowly for 2 minutes, it was placed stationary for 30 minutes, and 200 g of precipitated excess activated sludge (solid concentration 0.72%) was taken therefrom.

Next, 220 g of the city garbage from the identical batch of the aforementioned city garbage (dry solid 100 g), 200 g of the aforementioned excess activated sludge which came in contact with the treatment waste water, 100 g of the fermented slurry as seed culture taken from the identical batch which was used as above and 1.48 Kg of 60° C. warm water were charged into an acrilic cylindrical fermentation tank of 2 liter effective dimension, and an anaerobic digestion was performed at 60° C., pH 7 and 40 rpm stirring. The time course of the methane generation in the above operation are shown in FIG. 1. As Comparative Example 1, 220 g of city garbage, 192 g of untreated excess activated sludge, 0.72 Kg of the solid fraction which was separated in the aforementioned Preferred Embodiment 1 and 1.38 Kg of 60° C. water were mixed together, and an anaerobic digestion was performed under the same conditions as described above. The time course of the methane generation in this operation are also shown in FIG. 1. From the comparison of Preferred Embodiment (Curve 1) with Comparative Example (Curve 2), it is shown therein that the number of days required for fermentation can be reduced by the present invention from 12 days required by the conventional method to 7 days.

TABLE 1

| Ingredients | City Garbage | Paper | Inorganic Solids | Plastics | Others |
|---|---|---|---|---|---|
| Dry Base (%) Concentration | 60 | 16 | 10 | 5 | 4 |

What is claimed is:

1. An anaerobic digestion process for organic wastes comprising the following steps:
   (1) Anaerobically digesting organic wastes under simultaneous presence of facultative anaerobic bacteria and obligatory anaerobic bacteria,
   (2) Separating the anaerobically digested slurry obtained from step (1) into a liquor fraction containing the two groups of bacteria and an undecomposed solid fraction,
   (3) Mixing under anaerobic conditions, the liquor fraction obtained from step (2) with surplus activated sludge produced by aerobically treating organic waste water,
   (4) Separating the mixed slurry obtained from step (3) into a solid fraction containing the surplus activated sludge which has absorbed the two groups of bacteria and a liquor fraction, and
   (5) Recycling back the solid fraction obtained from step (4) as a source of nitrogen and the source of the two groups of bacteria to step (1).

2. An anaerobic digestion process for organic wastes according to claim 1, wherein facultative anaerobic bacteria capable of decomposing cellulose is used when employing as the feedstock, organic wastes containing cellulose as the main ingredient, in which the cellulose fibers thereof are converted in a pretreatment step into much shorter fibers by anaerobically contacting the feedstock, and wherein all or a part of the solid fraction obtained from step (4), is introduced prior to step (1).

3. An anaerobic digestion process for organic wastes comprising the following steps:
   (1) Dividing organic wastes into volatile fatty acids anaerobically by using facultative anaerobic bacteria,
   (2) Separating the treated slurry obtained from step (1) into a liquor fraction containing facultative anaerobic bacteria and an undecomposed solid fraction,
   (3) Mixing under anaerobic conditions, the liquor fraction obtained from step (2) with surplus activated sludge slurry produced by aerobically treating organic waste water
   (4) Separating the mixed slurry obtained from step (3) into a solid fraction containing the surplus activated sludge which has absorbed the facultative anaerobic bacteria and a liquor fraction containing the volatile fatty acids,
   (5) Recycling back the solid fraction obtained from step (4) to step (1) to be used as the facultative anaerobic bacteria,
   (6) Anaerobically digesting the liquor fraction obtained from step (4) and the solid fraction obtained from step (2) under simultaneous presence of facultative anaerobic bacteria and obligatory anaerobic bacteria,
   (7) Separating the liquor fraction containing the anaerobically digested slurry obtained from step (6) into a liquor fraction containing the two groups of bacteria and an undecomposed solid fraction,
   (8) Mixing under anaerobic conditions, the liquor fraction obtained from step (7) with surplus activated sludge produced by aerobically treating organic waste water,
   (9) Separating the mixed slurry obtained from step (8) into a solid fraction containing the surplus activated sludge which has absorbed the two groups of bacteria and a liquor fraction,
   (10) Recycling back the solid fraction obtained from step (9) to step (6) to be used as the two groups of bacteria.

4. An anaerobic digestion process for organic wastes according to claim 3, wherein facultative anaerobic bacteria capable of decomposing cellulose is used when employing as the feedstock, organic wastes containing cellulose as the main ingredient, in which the cellulose fibers thereof are converted in a pretreatment step into much shorter fibers by anaerobically contacting the feedstock, and wherein all or a part of the solid fraction obtained from step (4), is introduced prior to step (1).

* * * * *